United States Patent Office 3,179,691
Patented Apr. 20, 1965

3,179,691
METHOD OF PRODUCING DICHLORO-
BENZONITRILES
Harmannus Koopman, Weesp, and Cornelis Johannes
Schoot, Eindhoven, Netherlands, assignors to North
American Philips Company, Inc., New York, N.Y., a
corporation of Delaware
No Drawing. Filed Apr. 27, 1960, Ser. No. 24,913
Claims priority, application Netherlands, Apr. 28, 1959,
238,688
4 Claims. (Cl. 260—465)

The production of the insecticide γ-hexachlorocyclo-
hexane from crude hexachlorocyclohexane, gives rise to
a considerable quantity—up to approximately 80%, cal-
culated over crude hexachlorocyclohexane—α- and β-
hexachlorocyclohexane. For the last-mentioned isomers,
in proportion to the quantity obtained in producing γ-
hexachlorocyclohexane on an industrial scale, partically
no use and consequently no scale could be found. It is
known that hexachlorocyclohexane permits being con-
verted, by pyrolysis, into trichlorobenzenes, inter alia,
1.2.3-trichlorobenzene.

Applicant has found that 1.2.3-trichlorobenzene can
easily be converted into a product suitable for use as an
active constituent of herbicidal preparations that are
likely to find a wide range of practical applicability.

The present invention relates to methods of producing
chlorobenzonitriles, characterized in that 1.2.3-trichloro-
benzene is converted into a mixture of 2.3-dichlorobenzo-
nitrile and 2.6-dichlorobenzonitrile in a manner known
for this type of conversion, in an analogous manner or
in a manner as described herein.

This conversion may be carried out by means of cuprous
cyanide, preferably in the presence of a tertiary nitrogen-
base having a boiling point above approximately 200° C.
In this case, 1.2.3-trichlorobenzene, preferably with less
than the equivalent of cuprous cyanide necessary for the
conversion into dichlorobenzonitrile and a quantity of a
tertiary nitrogen-base referred to equivalent to or exceed-
ing that of the 1.2.3-trichlorobenzene, is heated at a tem-
perature above approximately 200° C. and preferably be-
tween 220° C. and 250° C. Applicant has found that
mainly mono-nitriles are formed in this way. As a
tertiary nitrogen-base preferably one is used in which the
cuprous cyanide and 1.2.3-trichlorobenzene dissolve at
the reaction temperature. Suitable tertiary nitrogen-bases
are, in particular, aromatic ones such as, for example,
pyridine, collidine, picolines and lutidines, isoquinoline
and, in particular, quinoline. After completing the reac-
tion at normal pressure or in vacuo, the mixture can be
distilled in either case whether or not by means of an
auxiliary gas, for example super-heated steam. At 760
mms. mercury pressure, the boiling range is 220° C. to
240° C., at 8 mms. mercury pressure 115° C. to 130° C.
In order to remove the tertiary nitrogen-base, the distillate
may be dissolved in an organic solvent, for example
petroleum ether (boiling range 40° C. to 60° C.) and the
resulting solution washed with dilute hydrochloric acid,
the tertiary nitrogen base entering into solution in the
form of the hydrochloric acid salt, from which the tertiary
nitrogen base can be recovered by adding, e.g., a solution
of sodium hydroxide. Separation of the produced di-
chlorobenzonitriles and unchanged 1.2.3-trichlorobenzene
can be effected by fractional distillation or by washing the
solution in petroleum ether with concentrated sulphuric
acid, pouring the sulphuric acid solution onto ice and
water, filtering off the resulting precipitate, rinsing with
water and drying. Any 1.2.3-trichlorobenzene not con-
verted remains dissolved in the petroleum ether and is
recoverable after distilling off the petroleum ether.

Applicant has found that, dependent upon the reaction
conditions and the constitution of the chemicals used, the
aforesaid distillation of the reaction mixture leaves a
greater or lesser quantity of tarry substance.

It has been found that, when using 1.2.3-trichloroben-
zene in excess relatively to the quantity of cuprous
cyanide used, the residual tarry substance is lesser and,
calculated over the quantity of cuprous cyanide used, a
higher yield of 2.3-dichlorobenzonitrile and 2.6-dichloro-
benzonitrile is obtained. For example, when using 6 mol
1.2.3-trichlorobenzene on 1 mol cuprous cyanide, the yield
of said dichlorobenzonitriles is twice as large as when us-
ing equivalent quantities. Therefore, the reaction is pref-
erably carried out with 0.1 to 0.3 times the theoretical
quantity of cuprous cyanide required for converting 1.2.3-
trichlorobenzene into dichlorobenzonitrile.

The resulting mixture of dichlorobenzonitriles usually
contained 40 to 70% of 2.6-dichlorobenzonitrile and 60%
to 30% of 2.3-dichlorobenzonitrile.

The conversion of 1.2.3-trichlorobenzene into dichloro-
benzonitriles may alternatively be effected by means of
hydrocyanic acid. For this purpose a mixture of approxi-
mately equivalent quantities of both of them is passed
over a copper-containing metal, for example copper or
brass gauze or powder at a temperature of 500° C. to
900° C. From the product obtained upon condensation
the mixture of dichlorobenzonitriles and the unchanged
1.2.3-trichlorobenzene can be separated, if desired after
distillation, in the aforesaid manner, e.g., after dissolving
the product in petroleum ether.

From the mixture of 2.3-dichlorobenzonitrile and 2.6-
dichlorobenzonitrile obtained by the method according to
the invention either of them can be separated, for example
by crystallization from organic solvents such as for exam-
ple petroleum ether (boiling range 40° C. to 60° C.),
methanol and ethanol.

In order that the invention may be readily carried into
effect, several examples will now be described in detail.

Example 1

A mixture of 55 gms. (0.3 g. mol) of 1.2.3-trichloro-
benzene, 52 gms. (0.4 g. mol) of quinoline and 10 gms.
(0.11 g. mol) of cuprous cyanide were heated under reflux
(temperature 230° C. to 234° C.) for 90 minutes, the
cuprous cyanide entering into solution. Subsequently,
the mixture was distilled at reduced pressure. Boiling
range 115° C. to 130° C. at 8 mms. mercury pressure.
This yielded 102 gms. of a mixture consisting of unchanged
1.2.3-trichlorobenzene, 2.3-dichlorobenzonitrile, 2.6-di-
chlorobenzonitrile and quinoline. This mixture was dis-
solved in twice the volume of petroleum ether (boiling
range 40° C. to 60° C.). The solution was washed three
times with 75 ccs. of 2 N hydrochloric acid in order to
separate the quinoline. (The latter could be recovered
quantatively by means of caustic soda solution.)

The isomerous dichlorobenzonitriles were extracted
from the petroleum ether by washing three times with 75
ccs. of sulphuric acid (96% by weight). The sulphuric
acid solution was poured onto ice and water, the resulting
precipitate filtered off and dried in air. Yield: 8.5 gms.
(45% calculated over the initial cuprous cyanide).

The resulting mixture contained 51% by weight of 2.3-
dichlorobenzonitrile and 49% by weight of 2.6-dichloro-
benzonitrile.

40.5 gms. of 1.2.3-trichlorobenzene were recovered
from the petroleum ether.

From the mixture of the isomerous dichlorobenzo-
nitriles the individual isomers were obtained by crystal-
lization from methanol.

Example 2

Carried out exactly similarly as Example 1.
Starting with 55 gms. of 1.2.3-trichlorobenzene, 52 gms.
of quinoline and 20 gms. of cuprous cyanide, 13.5 gms.

(36% calculated over the initial cuprous cyanide) were obtained of a mixture consisting of 45% by weight of 2.3-dichlorobenzonitrile and 55% by weight of 2.6-dichlorobenzonitrile.

*Example 3*

Carried out exactly similarly to Example 1.

55 gms. of 1.2.3-trichlorobenzene, 52 gms. of quinoline and 30 gms. of cuprous cyanide gave 10.5 gms. (28% calculated over the initial cuprous cyanide) of a mixture consisting of 39% by weight of 2.3-dichlorobenzonitrile and 61% by weight of 2.6-dichlorobenzonitrile.

*Example 4*

Carried out exactly similarly as Example 1.

55 gms. of 1.2.3-trichlorobenzene, 52 gms. of quinoline and 5 gms. of cuprous cyanide gave 3.5 gms. (56% calculated over the cuprous cyanide started with) of a mixture consisting of 48% by weight of 2.3-dichlorobenzonitrile and 52% by weight of 2.6-dichlorobenzonitrile.

In tests, in which pyridine, collidine and pyridine-bases respectively were substituted for quinoline, the yields of dichlorobenzonitriles were lower.

*Example 5*

1.2.3-trichlorobenzene together with excess hydrocyanic acid (HCN) and nitrogen were passed at about 700° C. over brass chips through a quartz tube. The gas was subsequently passed through water and a solid material separated out. This material was filtered off and dissolved in petroleum ether (boiling range 40° C. to 60° C.). Exactly similarly as Example 1, the solution was washed with concentrated sulphuric acid in petroleum ether, the sulphuric solution poured onto ice and water, the resulting precipitate filtered off and dried.

Yield: 50% (calculated over 1.2.3-trichlorobenzene started with) of a mixture consisting of approximately 50% by weight of 2.3-dichlorobenzonitrile and approximately 50% by weight of 2.6-dichlorobenzonitrile. Unchanged 1.2.3-trichlorobenzene was recovered from the petroleum ether.

Applicant has found that the mixture of dichlorobenzonitriles and the components thereof, that is 2.3-dichlorobenzonitrile and 2.6-dichlorobenzonitrile, obtained by the method according to the invention have herbicidal activity and are particularly practicable for combating undesirable plant growth as a result of their growth-slowing effect on seeds and seedlings of mono- and dicotyledons.

2.6-dichlorobenzonitrile is a substance known per se. 2.3-dichlorobenzonitrile has not been described in the literature, nor the mixture containing both of them according to the invention either.

The individual dichlorobenzonitriles and the mixture thereof obtained by the method according to the invention are adapted to be worked up into preparations for combating undesirable plant-growth, for example into dusts, wettable powders and miscible oils, in any of the manners known per se, by mixing with or dissolving in inert solid or fluid carries and with the admixture of surface-active substances, dispersion agents and/or adhesives.

What is claimed is:

1. The method of preparing a mixture of 2,3-dichlorobenzonitrile and 2,6-dichlorobenzonitrile, which method comprises heating at a temperature above 200° C., 1,2,3,-trichlorobenzene with from about 0.1 to 0.3 times the theoretical quantity of cuprous cyanide required for conversion into dichlorobenzonitrile in the presence of a tertiary nitrogen base having a boiling point above about 200° C.

2. The method of claim 1, in which the tertiary nitrogen base is quinoline and the reaction is carried out at a temperature between 220° C. and 250° C.

3. The method of claim 1, in which the 2,3-dichlorobenzonitrile is separated from the reaction mixture.

4. The method of claim 1, wherein 2,6-dichlorobenzonitrile is separated from the reaction mixture.

References Cited by the Examiner

UNITED STATES PATENTS

| | | | |
|---|---|---|---|
| 2,553,405 | 5/51 | Dixon | 260—465 |
| 2,790,819 | 4/57 | Godfrey | 260—465 |
| 2,910,353 | 10/59 | Jordan | 71—2.3 |
| 2,978,310 | 4/61 | Daams et al. | 71—2.3 |
| 3,009,942 | 11/61 | Klein et al. | 260—465 |
| 3,027,248 | 3/62 | Koopman et al. | 71—2.3 |

OTHER REFERENCES

Wagner and Zook: "Synthetic Organic Chemistry," 1953, page 591.

CHARLES B. PARKER, *Primary Examiner.*

M. A. BRINDISI, JOSEPH P. BRUST, *Examiners.*